Feb. 6, 1951 G. C. THOMAS, JR 2,540,999
CABLE CONNECTOR
Filed July 30, 1949 2 Sheets-Sheet 1

INVENTOR.
GEORGE C. THOMAS, JR.
BY James C. Ledbetter
ATTORNEY.

Feb. 6, 1951  G. C. THOMAS, JR  2,540,999
CABLE CONNECTOR

Filed July 30, 1949  2 Sheets-Sheet 2

INVENTOR.
GEORGE C. THOMAS, JR.
BY
James C. Ledbetter
ATTORNEY.

Patented Feb. 6, 1951

2,540,999

UNITED STATES PATENT OFFICE 2,540,999

CABLE CONNECTOR

George C. Thomas, Jr., Elizabeth, N. J., assignor to The Thomas & Betts Co., Elizabeth, N. J., a corporation of New Jersey Application July 30, 1949, Serial No. 107,660

5 Claims. (Cl. 285—6.5)

This invention relates to a new and useful cable connector adapted to be anchored in a knockout opening of a conventional conduit or raceway box for fastening cable (sheathed conductors) in place therein when installing electrical raceway systems.

The connector herein comprises a new fitting in the electrical field for assembling raceways which enclose insulated electrical conductors comprising the wiring of light and power circuits and more particularly for connecting raceway conductor sheathing with conduit boxes and the like. Raceway fittings of this type are not electrical connectors; they are non-conductive, mechanical-joint-forming devices, insulated from the wiring enclosed within its protective raceway or sheathing.

One type of flexible sheathed electrical conductor is known as "Non-Metallic Sheathed Cable" and comprises a smooth and tight wrapping of tough fabric impregnated with a binder of insulating compound which encases the copper or aluminum wires. A second type is known as "BX cable" which pre-contains its wires, and a third is "Flexible-metallic conduit" without wires but through which they are pulled after the conduit is installed. Both latter types comprise a flexible-metallic armor sheathing in the form of well known "spiral-armor" which encloses the wiring. All three types of cable mentioned comprise flexible "sheathed conductor."

The raceway cable connector herein is characterized by a new "four-sided clamping member" operatively mounted in a tubular body and universally adapted to all three of the standard types of cable, that is, adapted to secure each one thereof within the tubular body by which the latter connects such cable within the conventional knockout opening of a conduit box forming a part of an electrical raceway system.

A cable connector usually includes one means for fastening its tubular body within the box hole and another means for fastening the sheathed conductor or cable within the tubular body, two fastening functions being involved. As previously stated, this invention relates to the last mentioned fastening function, that of securing the cable (any type thereof) within the body of the connector.

Accordingly, it is a general purpose of this invention to provide a new cable connector which is universally adapted to non-metallic sheathed cable, as well as flexible-metallic conduit, and also the well known BX cable. Thus the invention is proposed as affording a range of utility in the production of connectors well adapted to the general run of sheathed conductors.

The drawings

The accompanying drawings with description and claims explain the invention as preferred and embodied at this time for an understanding of the problems sought to be solved. Since the teachings herein may suggest structural changes to others who wish to avail themselves of the benefits of the invention, it is pointed out that subsequent modifications hereof may well be the same in spirit and principle as this disclosure.

Fig. 1 shows the three separate parts of the cable connector, comprising a tubular body, its clamping member, and an operating screw. A lock nut also is shown, but it is conventional for anchoring the connector within a conduit box, as in Fig. 12 later described.

In Fig. 1, the parts are shown in spaced alignment for assembly. In this and other like views, the rear or outer cable-receiving end of the connector is at the left, and its front or inner box-anchorage end is at the right.

Fig. 2 shows a lengthwise section of the assembled connector with the end of a flexible-metallic conduit, that is, spiral-armor, secured in the tubular body, the fragment thereof being shown in diagrammatic form. The spiral-armor (conductor sheathing) is omitted from all other views. In fact, the tubular body shown in this view also handles non-metalilc sheathing, as hereinafter explained, and thus is suited to all types of cable.

Fig. 3 is a top view of the connector, while

The views on Sheet 2 are drawn to a somewhat larger scale, than in Sheet 1, for more fully showing the new four-sided clamping member of trapezoidal form.

Figs. 7 through 11 show various views of the new clamping member—in side elevation, front and rear elevations, the bottom thereof, and a top view.

Figure 12:
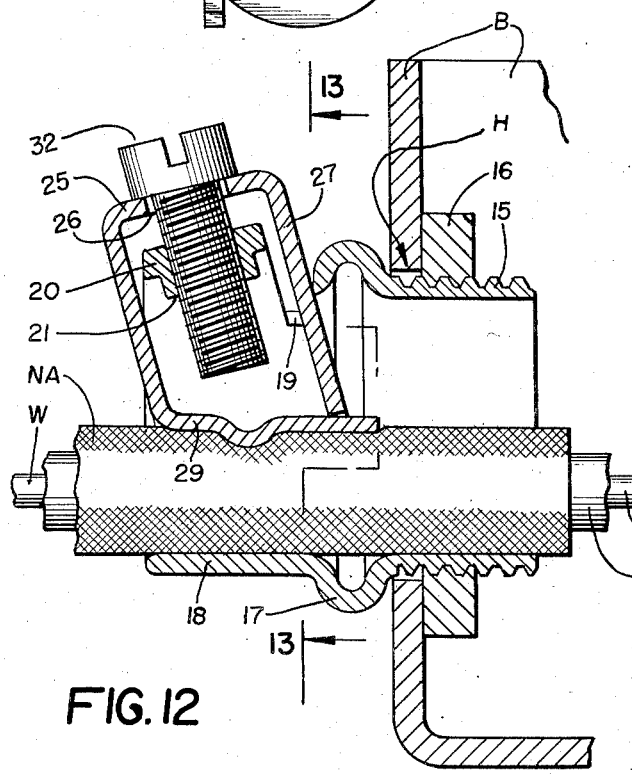

Fig. 12 demonstrates the function of the connector in service position with a flexible non-metallic sheathed cable secured therein by the new clamp. This view also shows the connector anchored within a knockout hole through the wall of a conduit box in the usual way.

Figure 13:
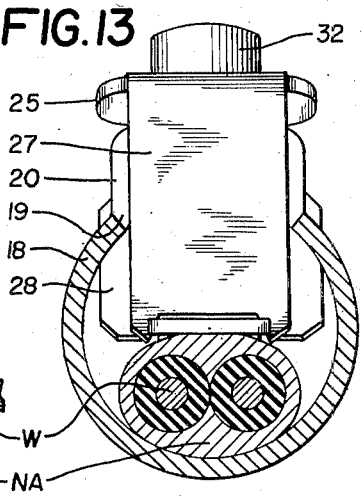

Fig. 13 is a transverse section developed on the line 13—13 looking toward the rear end of the connector and at the front flat leg of the clamping member under screw pressure and gripping the non-metallic cable within the tubular body.

Figure 2:
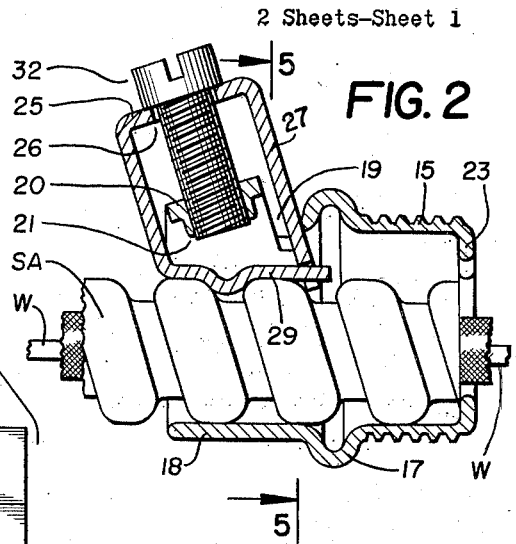
Figure 3:
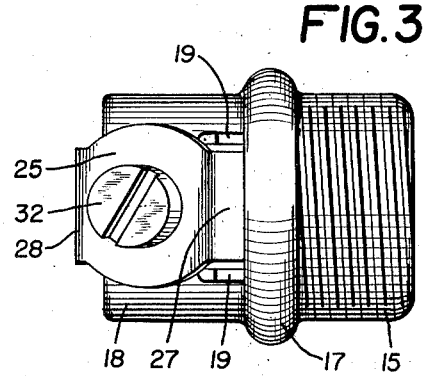
Figure 4:
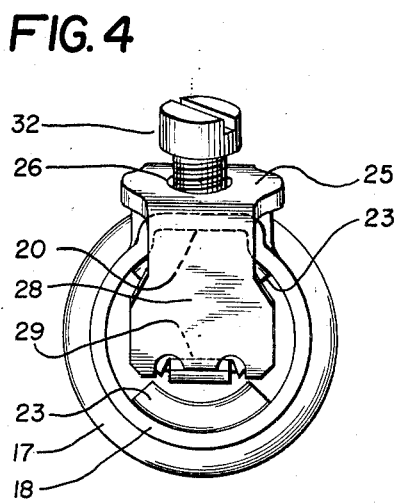
Fig. 4 is a rear end elevation thereof.
Figure 5:
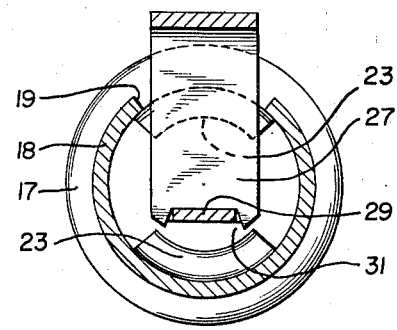
Fig. 5 is a transverse section developed approximately on the line 5—5, the spiral-armor being omitted, and looking toward the front end of the connector.

It is observed that Figs. 2 and 12 are comparison views illustrating the adaptability of the connector to all types of flexible sheathed conductors. The first shows metallic spiral-armor cable, while the second is non-metallic sheathed cable. In practicing the invention, the new clamping member herein (Figs. 7 through 11) is employed for all types of cable. However, the tubular body of the connector shown in Fig. 2 is broad in its use and handles both spiral-armor cables and non-metallic sheathed cables, while the connector body in Fig. 12 is of limited use and only takes the latter.

*Explanation of tubular bodies and types of cable*

Referring further to the drawings, a conventional form of tubular body is open at both ends and has its front end 15 threaded to receive a lock nut 16. An external annular shoulder 17 is formed centrally of the body, and the rear end 18 has a crosswise slot 19 made through the tubular wall adjacent the shoulder. A raised boss portion 20 is formed outward on the rear end of the body, the outer flat wall of the boss being inclined upward and forward to the crosswise slot 19. A screw-threaded hole 21 is provided through the boss on an axis perpendicular to its outer flat wall, thus tilting the threaded hole at a forward angle and inward of the tubular body.

The description in the foregoing paragraph of the tubular body 18 applies, in general, to both tubular bodies shown on Sheets 1 and 2, the exception to which is next given and concerns the environment of the invention, the new clamp, the two forms of tubular bodies, and the three types of standard cable.

On Sheet 1, the front end of the tubular body has its opening restricted by a conventional bushing-stop 23, in fact two thereof. They are segmental and in the form of inturned lips diametrically opposite each other. Consequently, this bushing pair 23 does not reduce or restrict the inside diameter of the tubular body when measured on its major diameter perpendicular to the axis of the screw-threaded hole 21. The two segmental bushing-stops do, however, provide a minor axis and thus restrict the front end opening of the body when measured on its diameter parallel with the axis of the screw hole 21.

It is, therefore, the bushing 23, which modifies the tubular body 18 on Sheet 1, distinguishes it in form as well as in purpose from the otherwise identical body 18 on Sheet 2, and makes the latter (by reason of its bushing 23) universal in use with all types of sheathed conductors heretofore mentioned. This is true even though spiral-armor only is shown with the bushed body 18 and 23 on Sheet 1.

On the other hand, the tubular body 18 shown on Sheet 2 has a full and unrestricted cylindrical opening at its front end 15, the bushing-stop 23 being omitted as observed. By reason thereof, the body 18 shown in the assembly views (Figs. 12 and 13) is for use only with non-metallic sheathed conductors.

Thus, in Fig. 2 the end of a flexible-metallic spiral-armor sheath SA is shown inserted into the rear end of the tubular body, while in Fig. 12 a flexible non-metallic sheath NA is shown likewise inserted from and into the rear end of and all the way through the body. As is well known in the art, both types of sheathing (used in three types of cable) enclose and protect the electrical wiring which passes through a cable connector and enters a conduit box.

Such a conduit or raceway box is shown diagrammatically at B in Fig. 12, with a knockout hole H therein. Although well-known, it is pointed out that the front end 15 of the connector is inserted from the outside into the box hole H, and the nut 16 on the inside draws the shoulder 17 of the tubular body into clamped engagement with the outer surface of the box wall B. Thus the connector 18 is anchored in the box B and provides a tubular raceway passage for electrical wiring W to emerge from the spiral-armor SA or from the non-metallic sheath NA (as the case may be) and enter the box. In this connection, compare Figs. 2 and 12.

Further, as to the installation of non-metallic cable NA, it is essential that its inner end extend beyond the front inner end edge of the tubular body, and it is so illustrated in Fig. 12. Accordingly, the front end 18 of the tubular body (Fig. 12) is fully open and not bushed with a stop, as at 23 in Fig. 2. Conversely, it is equally essential that the inner end of spiral-armor cable SA come to a stop at the front inner end of the tubular body—thus the bushing-stop 23—and it is so illustrated in Fig. 2.

Next, it is pointed out that one type of non-metallic sheathed cable, as at NA, is oval in cross section. Accordingly, oval sheathing may be used with the bushed connector body 18 and 23 shown on Sheet 1. It is readily seen that such oval sheathing NA can be drawn through the major axis of the tubular body in Fig. 2 and rest upon one or the other bushing-stops 23. In fact, any non-metallic cable of a size which will pass between the smooth edges of the two oppositely disposed segmental bushings 23 can be used with the Fig. 2 cable connector.

By reason of the foregoing and the comparison made, both spiral-armor cable SA and non-metallic cable NA may be used with the tubular body 15 bushed at 23. The converse is not true in respect to the full and straight-open form of tubular body shown in Figs. 12 and 13, which means that only non-metallic cable NA may be used with it.

The foregoing explanation is given of the three types of cable and two connector bodies in order to make clear the environment of the invention (one form of new clamp) and its breadth of utility with all sheathed conductors.

*The new clamping member*

Figure 6:
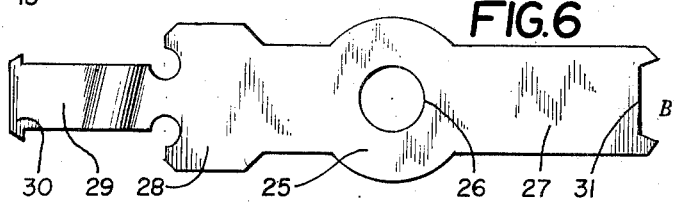
Fig. 6 shows an approximate lay-out of a flat sheet-metal stamping of a clamping member before being fashioned into final form, as shown in the next five views.

Fig. 6 shows a flat sheet-metal stamping from which the new clamping member is made. Cold-rolled steel or other malleable sheet material is used in order to die-form and fashion the clamp and also to provide for a flexing or bending operation when assembling it on or in the tubular body 18 heretofore described.

The clamp comprises a one-piece four-sided part in the shape of a trapezoid. Three sides thereof are integrally formed with each other, and one extremity of the fourth side is also integral with the other three, while its other extremity is free but latches through a joint to one of the other sides. Such an arrangement produces an integrated clamping member unified into a braced structure as a whole, wherein the strain of clamping compression is equalized through all the sides.

The sheet-metal blank of Fig. 6 is laid out and proportioned to provide a clamping crotch 25 having a screw clearance hole 26 in its center. For convenience, part number "25" also refers to the one-piece four-sided clamp as a unit or whole. A front leg 27 is integrally formed with the front end of the crotch, while a rear leg 28 is integral with the rear end thereof. A clamping or gripping plate 29 has its rear extremity integral with the rear leg 28. Also, a T-head 30 is made on the free or front extremity of the gripping plate 29, and an entry-notch 31 is made in the free end of the front leg 27. These two end-shapes 30 and 31 are mutually interfitting and complementary to each other to form a joint.

In considering all of the views of the clamp 25 per se (Figs. 6 through 11), it will be observed that its front leg 27 is somewhat longer than the rear leg 28. When the blank of Fig. 6 is die-stamped and fashioned into final form, the result is the one-piece four-sided clamping member of trapezoidal shape, as shown throughout the drawings. It is seen that the front and rear legs may extend parallel with each other from the crotch 25, and that these three sides assume the form of a yoke or U-shaped member. However, the reach of the gripping plate 29 between the two legs closes the yoke and provides a four-sided clamping member of braced and unified trapezoidal shape.

As observed in the assembly views throughout, an operating headed-screw 32 is mounted through the screw clearance hole 26. This screw actuates the clamp 25 inwardly in relation to the tubular body for securing the cable SA or NA therein, as the case may be, and later described.

*Assembly of clamp with body, and operation*

Figure 1:
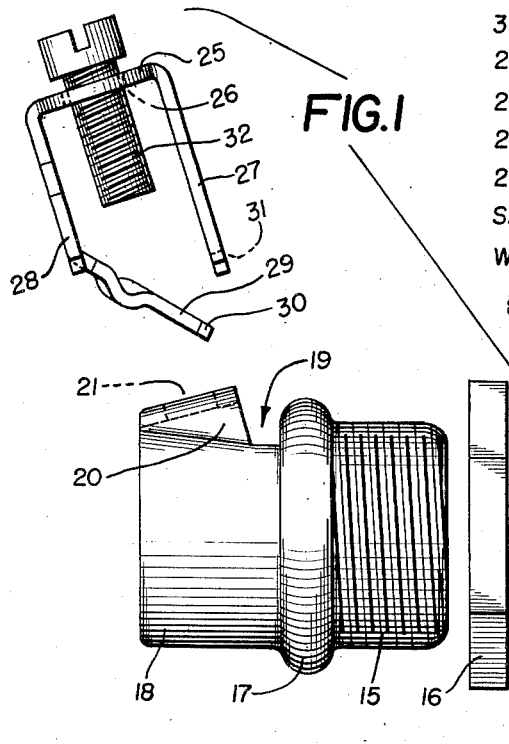
Figure 7:
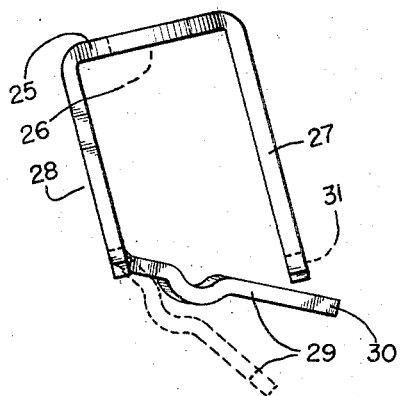
Figure 8:
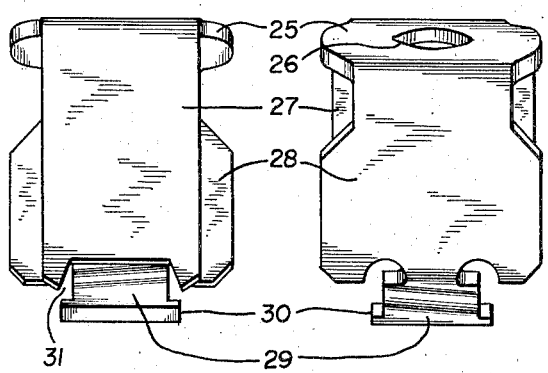
Figure 9:
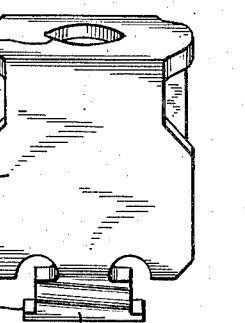
Figure 10:
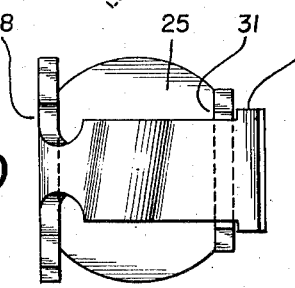
Figure 11:
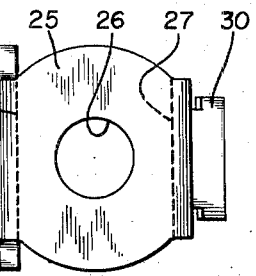

When first formed and hence prior to mounting the four-sided clamping member 25 within the tubular body 18, the gripping plate 29 is left open, as shown in Fig. 1 and in dotted lines in Fig. 7. In other words, the front free extremity of the gripping plate remains spaced from the inner free end of the front leg 27 when the clamp is initially made. The space thus provided permits the clamp to be assembled with the tubular body.

Mounting the four-sided clamp 25 in operative position is accomplished by tilting and hooking it through the open space, between the leg 27 and plate 29, onto the rear end of the tubular body 18. Thus the front leg 27 is confined in the crosswise slot 19, and the rear leg 28 is mounted adjacent the rear end of the connector body. When the clamp thus embraces the body, the inclined boss 20 tilts the legs 27 and 28 forward and inward thereof. Thus the boss 20 and the crosswise slot 19 operatively mount and guide the clamp in the position shown, the differential length legs extending inward an equal radial distance.

Having placed the four-sided clamp 25 in position on the tubular body 18, the space or gap between the front leg 27 and front extremity of the gripping plate 29 is closed by inserting a tool into the tubular body and prying the front extremity of the plate toward the inner free end of the leg 27. This is accomplished by reason of the fact that the clamp is made of malleable flat stock, and thus the integral extremity of the plate 29 is bendable on and in relation to the inner end of the rear leg 28 with which it is formed in one piece.

There may be some spring-back of the gripping plate 29 from the leg 27 after prying and bending the plate into contiguous or adjacent position with the leg 27. This slight amount of retraction or back-flexure is shown in Figs. 7, etc., where the plate has slightly retracted from the front leg. If no spring-back occurs, the T-head 30 immediately engages within the entry-notch 31 and latches therewith. However, if some spring-back takes place, it is of minor importance because the T-head 30 and notch 31 close and engage each other and thus lock the four-sided clamping member 25 into an integrated whole when screw pressure is applied and the gripping plate under pressure against the cable SA or NA, as the case may be.

The assembly of the cable connector is completed by mounting the operating headed-screw 32 through the free or clearance hole 26 and running the screw into the threaded hole 21 tilted forward in the tubular body. The head of the screw engages the clamping crotch 25 and advances the four-sided clamp inward.

The gripping plate 29 clamps equally well against the spiral armor SA or the non-metallic sheathing NA. When screw pressure is applied, the clamp 25 is actuated inward, the gripping plate seats under clamping pressure against the cable, and the latching means 30 and 31 of the four-sided member automatically and positively engage to make a good joint effective against release, and thus integrate and solidify the four-sided clamp into a unified whole.

It is important to observe that the crosswise fit of the flat-type front and rear legs—and the gripping plate 29 spanning the distance between their inner ends—results in a substantially long bearing grip of the clamp against the cable.

By reason of the forward tilted attitude of the legs, particularly the front leg 27 and its greater length, it follows that any outward stress or tension on the cable—tending to pull it out of the connector—merely augments the grip of the plate 29 and front leg 27 upon the cable. Such stress also more securely locks the T-head and notch joint 30 and 31.

Accordingly, the new clamp 25 is common to the three types of cable herein referred to and also common to the two forms of connector bodies described. Such a raceway fitting simplifies manufacturing problems and possesses marked utility.

This disclosure explains the principles of the invention and the best mode contemplated in applying such principles, so as to distinguish the invention from others; and there is particularly pointed out and distinctly claimed the part, improvement or combination, which constitutes the invention or discovery, as understood by a comparison thereof with the prior art.

This invention is presented to fill a need for a new and useful cable connector. Various modifications in construction, mode of operation, use and method, may and often do occur to others, especially so after acquaintance with an invention. Accordingly, it is to be understood that this disclosure is exemplary of the principles herein and embraces equivalent constructions.

What is claimed is:

1. In a cable connector having a tubular body adapted to receive a sheathed conductor and be anchored in a box hole, and being provided with a crosswise slot; the novel means herein for securing the sheathed conductor in the tubular body, comprising a four-sided clamping member including a crotch having a front and a rear leg, the front leg being mounted through the crosswise slot, and the rear leg at the rear end of the body, both of which legs operatively extend an equal radial distance inwardly of said body; a gripping plate extending lengthwise of and within the body from the inner end of one leg to the other; and an operating screw having its head engaging the crotch, with its threaded shank mounted through a clearance hole provided through said crotch, and threadedly engaged within a screw hole formed through the body, to force the gripping plate lengthwise into clamping pressure against the sheathed conductor.

2. A cable connector as covered by claim 1, wherein the four-sided clamping member has three of its sides integrally formed, one extremity of the lengthwise gripping plate being free of and spaced from the inner end of one leg, whereby to facilitate mounting the four-sided clamping member in operative position on the tubular body; the free end of the gripping plate within said body being bent into position adjacent said inner end of said one leg to thereby close the space; and a joint provided between the free end of the plate and said one leg to thereby integrate the gripping plate as the fourth side with the other three sides of said clamping member.

3. A cable connector as covered by claim 1, wherein one extremity of the gripping plate is integral with the rear leg, and a latching joint secures the other extremity of the plate to the front leg, thereby integrating the four-sided clamping member into unified and braced structural form.

4. A cable connector as covered in claim 1, wherein one extremity of the gripping plate is integral with one leg, a T-head formed on the other extremity of the plate, and the inner end of the other leg having a notch into which the T-head latches to form a joint, thereby integrating the four-sided clamping member into braced and unified form.

5. A cable connector as covered by claim 1, wherein the lengthwise clamping plate is made of malleable flat stock and thus susceptible of flexure, one extremity of the plate being formed integral with the inner end of the rear leg, the other extremity being free of and spaced from the inner end of the front leg, whereby to facilitate mounting the clamping member operatively on the tubular body, the gripping plate within said body being set at its free extremity into position adjacent the front leg, the free end flexing under pressure lengthwise against the sheathed conductor to set said free end against the front leg, and a latch which automatically joins said free end with the front leg upon applying said pressure.

GEORGE C. THOMAS, Jr.

REFERENCES CITED

The following references are of record in the file of this patent:

UNITED STATES PATENTS

| Number | Name | Date |
| --- | --- | --- |
| 2,134,655 | Tornblom | Oct. 25, 1938 |
| 2,485,676 | Thomas | Oct. 25, 1949 |